(12) United States Patent
Maeda et al.

(10) Patent No.: US 6,199,989 B1
(45) Date of Patent: Mar. 13, 2001

(54) OPTICAL PLATE HAVING REFLECTING FUNCTION AND TRANSMITTING FUNCTION

(75) Inventors: Yasuteru Maeda, Moriya-machi; Susumu Miyazaki, Ibaraki; Koichi Fujisawa, Tsukuba, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/425,999

(22) Filed: Oct. 25, 1999

(30) Foreign Application Priority Data

Oct. 29, 1998 (JP) .................................................. 10-308542
Mar. 30, 1999 (JP) .................................................. 11-088636

(51) Int. Cl.$^7$ ....................................................... G02B 5/08
(52) U.S. Cl. ........................... 359/613; 359/614; 359/599
(58) Field of Search ................................ 359/613, 614, 359/599, 608, 609, 584, 364; 385/36

(56) References Cited

U.S. PATENT DOCUMENTS

| 5,467,417 | 11/1995 | Nakamura et al. | 385/36 |
|---|---|---|---|
| 5,521,725 | * 5/1996 | Beeson et al. | 359/40 |
| 5,797,668 | * 8/1998 | Kojima et al. | 362/31 |

FOREIGN PATENT DOCUMENTS

| 2 437 633 | 4/1980 | (FR) . |
|---|---|---|
| 55-46707 | 4/1980 | (JP) . |
| 55-103583 | 8/1980 | (JP) . |
| 6-194653 | 7/1994 | (JP) . |
| 9-73083 | 3/1997 | (JP) . |
| 9-222516 | 8/1997 | (JP) . |
| 10-10526 | 1/1998 | (JP) . |
| 10-73725 | 3/1998 | (JP) . |

* cited by examiner

*Primary Examiner*—Mohammad Y. Sikder
(74) *Attorney, Agent, or Firm*—Sughrue, Mion, Zinn, Macpeak & Seas, PLLC

(57) ABSTRACT

An optical plate having both a light reflecting function and a light transmitting function comprises
   a layer comprising convex members which are arranged inside or on a surface of the optical plate so that a tip of the convex portion faces a backside of the optical plate,
   a gap having a transmitting function which is formed between the convex members, and
   a reflecting layer which is arranged on an outer surface of the convex portion, and on a base or an inner surface of the convex portion,
   wherein said convex members, said gap and said reflecting layer are arranged so that a part of light ray from the backside directly passes through the gap between the convex members, that a part of remaining light ray is reflected at least one time at the reflecting layer on the outer surface of the convex portion and passes through the gap having a transmitting function formed between the convex members to come out from a surface of the optical plate, and that a part of incident light ray from the surface side is reflected at the reflecting layer on the base or the inner surface of the convex portion to come out from a surface of the optical plate.

16 Claims, 5 Drawing Sheets

OPTICAL PLATE HAVING REFLECTING FUNCTION AND TRANSMITTING FUNCTION

FIELD OF THE INVENTION

The present invention relates to an optical plate that can realize high transmittance and reflectance.

BACKGROUND OF THE INVENTION

In recent years, liquid crystal displays have been used for various apparatuses such as electronic personal organizers, personal digital assistants, amusement apparatuses and portable telephones in addition to notebook type word processors and personal computers. Of these, portable apparatuses frequently use transflective liquid crystal displays. The transflective liquid crystal displays are used as reflective displays using natural light or indoor light (hereinafter, referred to as reflecting condition) in the daytime and under well-lighted conditions, and are used as transmissive displays using backlights (hereinafter, referred to as transmitting condition) in the nighttime and under low light conditions. As a transflective liquid crystal display, it is known that a display comprises a first polarizer, liquid crystal cells (TN cells and STN cells), a second polarizer, a transflective plate and a backlight unit.

As a transflective plate used in these displays, it is known that a display achieves both a reflecting function and a transmitting function by dispersing inorganic particles having high refractive index such as pearl mica into a matrix, causing light to be reflected at the particles in the reflecting condition and causing light to be transmitted through the gap among the particles in the transmitting condition.

Japanese Laid-open Patent Application No. 55-103583 describes a reflecting transmitting member having a pattern in which parts that reflect light and parts that transmit light are alternately arranged.

Japanese Laid-open Patent Application No. Sho 55-46707 discloses a transflective polarizer in which transparent and/or semitransparent particles such as aluminum oxide, titanium oxide, aluminum, tin, gold or silver are uniformly dispersed in an adhesive material layer.

However, in a case where the conventional transflective plates are laminated to polarizers with a pressure-sensitive adhesive and attached to reflective liquid crystal displays and the displays are driven, both brightness and viewability are not always sufficient.

FIG. 1 is a view illustrative of the principle of a conventional transflective plate in which inorganic particles having high refractive index such as pearl mica or particles having high reflectance such as a metal are dispersed in a matrix. In FIG. 1, the downside corresponds to the backside, and the upside corresponds to the viewer's side. As shown in FIG. 1, since substantially only the light leaking through the gap among the particles is used when the display is used in the transmitting condition because of the presence of the light component coming from the backside and being reflected at the inorganic particles or the metal particles to return to the backside, the light use efficiency is inferior, so that the transmittance cannot be increased. That is, to obtain high transmittance, it is necessary to decrease the particle content or increase the transmittance, so that the reflectance decreases. To increase the reflectance, it is necessary to increase the particle content or increase the reflectance (the transmittance decreases), so that the transmittance decreases.

An object of the present invention is to provide an optical plate having high transmittance and high reflectance, and a transflective plate and a transflective light guide with which excellent brightness and viewability are obtained when attached to a transflective liquid crystal display and the display is driven.

SUMMARY OF THE INVENTION

The present inventors have intensively studied to solve the above-mentioned problems, and have found that an optical plate having high reflectance in the reflecting condition, high transmittance in the transmitting condition by effectively using the reflected light and excellent brightness and viewability can be obtained in both of the conditions by providing a light reflecting layer having a specific shape, and have completed the present invention.

That is, the present invention provides an optical plate having both a light reflecting function and a light transmitting function comprises a layer comprising convex members which are arranged inside or on a surface of the optical plate so that a tip of the convex portion faces a backside of the optical plate, a gap having a transmitting function which is formed between the convex members, and a reflecting layer which is arranged on an outer surface of the convex portion, and on a base or an inner surface of the convex portion, wherein said convex members, said gap and said reflecting layer are arranged so that a part of light ray from the backside directly passes through the gap between the convex members, that apart of remaining light ray is reflected at least one time at the reflecting layer on the outer surface of the convex portion and passes through the gap having a transmitting function formed between the convex members to come out from a surface of the optical plate, and that a part of incident light ray from the surface side is reflected at the reflecting layer on the base or the inner surface of the convex portion to come out from a surface of the optical plate.

DETAILED DESCRIPTION OF THE PREFERRED EMBODIMENT

Subsequently, the present invention will be described in detail.

An optical plate of the present invention will hereinafter be described with reference to the drawings by using, as an example, a structure of a convex member disposed inside or on the surface of the optical plate. However, the present invention is not limited to the illustrated example. In describing the present invention in detail, a liquid crystal display is taken as an example. However, the application of the present invention is not limited to a liquid crystal display.

Figure 1:
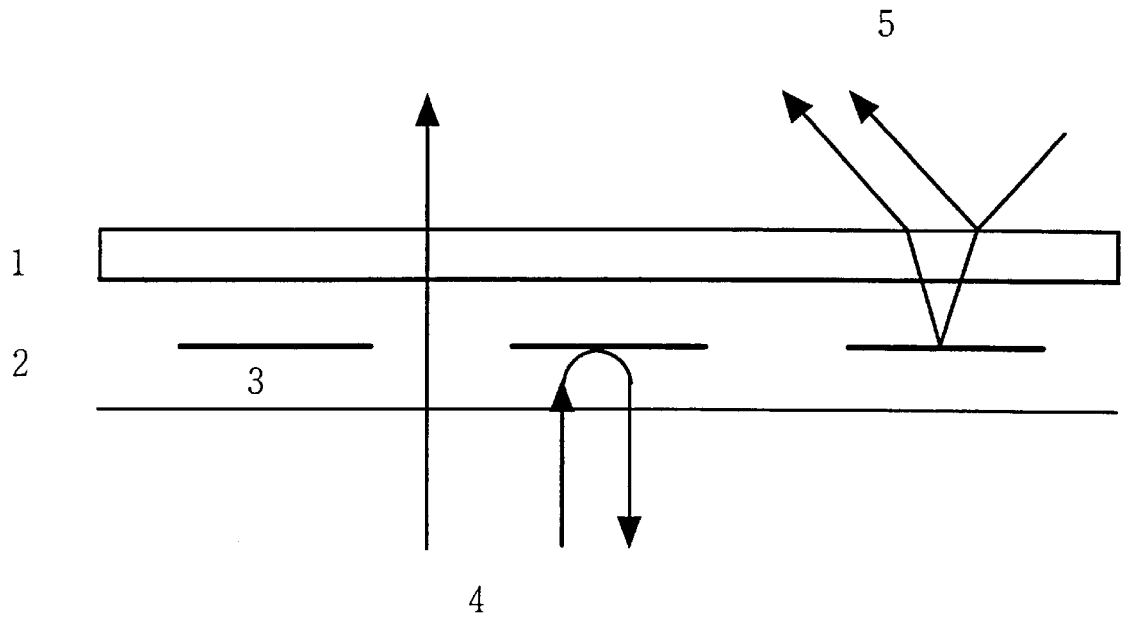
FIG. 1 A view showing a conventional transflective plate.
1: Liquid crystal panel
2: transflective plate
3: Particles
4: Transmitting condition
5: Reflecting condition
FIG. 2 A perspective view illustrative of the principle of the present invention, and a perspective view showing Example 2 of the present invention.
a: Ray trace of transmission of the light from the backside
b: Ray trace of reflectance of the light from the viewer
FIG. 3 A perspective view illustrative of the principle of the present invention, and a perspective view showing Example 7 of the present invention.
1: Cathode ray tube lamp
2: Reflector
3: Light guide
4: Reflecting plate
a: Ray trace of transmission of the light from the backside
b: Ray trace of reflectance of the light from the viewer
FIG. 4 A perspective view showing Example 4 of the present invention.
Figure 2:
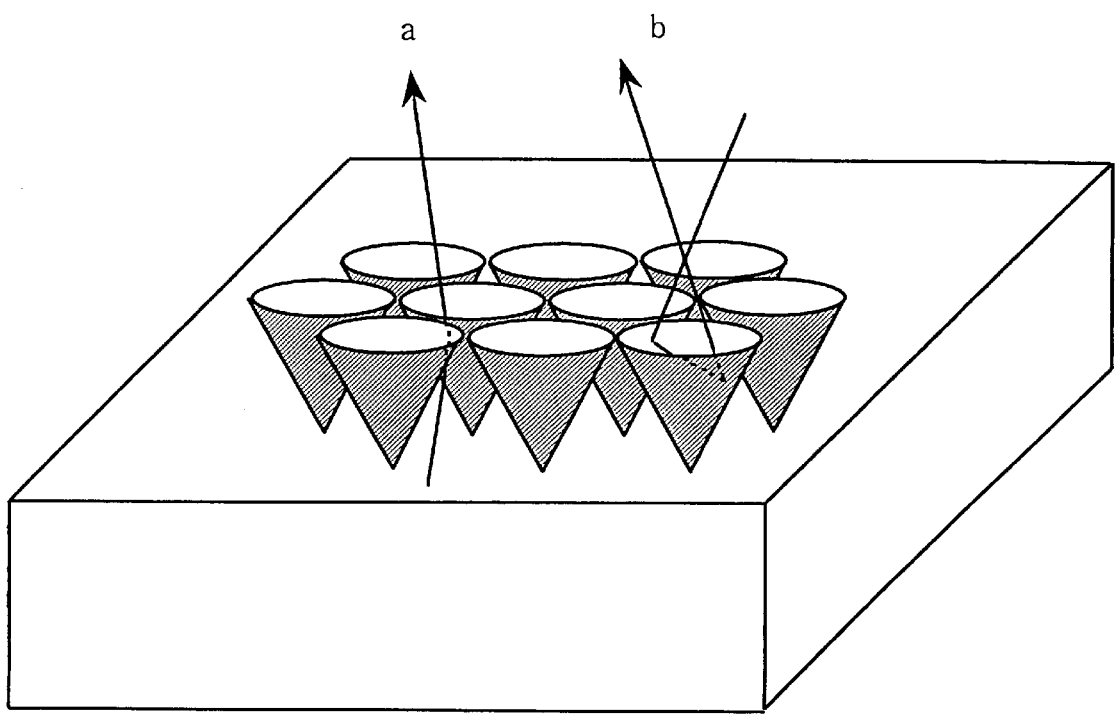
Figure 3:
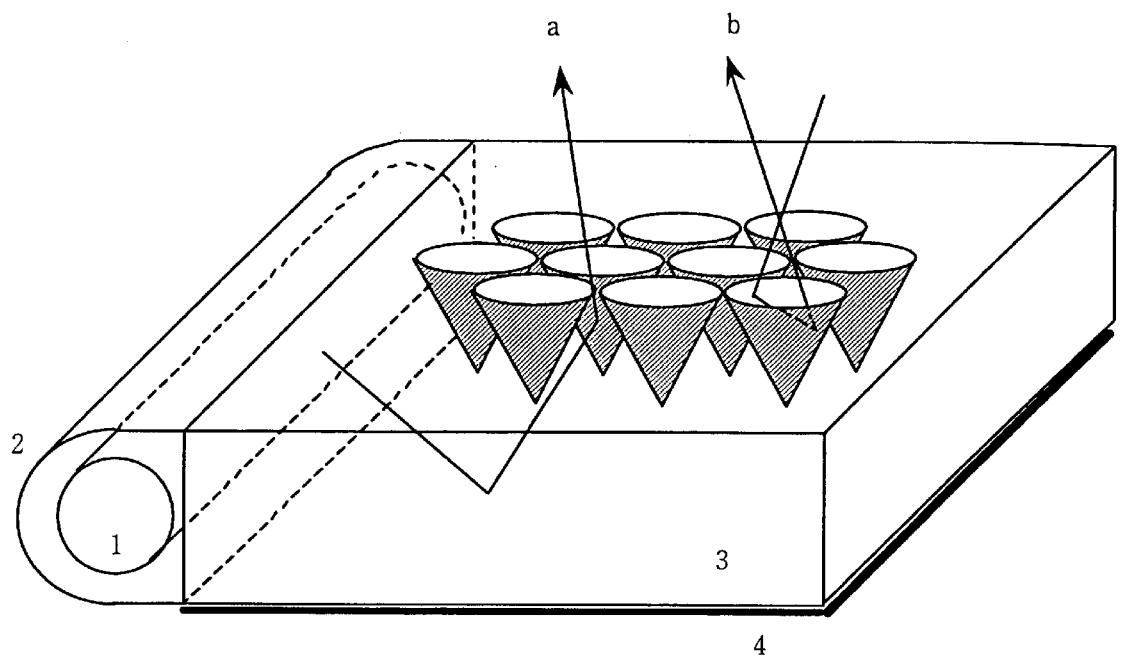

FIGS. 2 and 3 showing a transflective plate and a light guide having conical reflecting layers on the surface thereof, respectively, is a view illustrative of the principle of the present invention. The downside corresponds to the backside of the liquid crystal display, and the upside opposite thereto corresponds to the viewer's side.

In the transmitting condition where the backlight is on, most of the light of the backlight proceeds straight forward through the gap between the reflecting layers from below, or is reflected at the conical oblique surfaces of the reflecting layers and passes through the gap among the cones to reach the viewer's side. In the reflecting condition where sufficient natural light or indoor light is obtained, most part of natural light or indoor light coming from above other than the part that passes through the gap among the reflecting surfaces to reach the backside is reflected at the reflecting surfaces to reach the viewer's side. In this case, the ratio of the reflected light to the illuminating light substantially equals the ratio of the area of projection from the viewer's side of the reflecting layers to the entire area of the transflective plate.

Therefore, the light use efficiency is much higher in both the transmitting and the reflecting conditions than that in the case of the conventional method.

In a light guide of the present invention, the light use efficiency becomes remarkably high as it is no need to use a transflective plate and therefore there is no loss of the light by absorption of the transflective plate In the present invention, as the shape of the convex member, at least one kind of a structure selected from the group consisting of a right circular cone, an oblique circular cone, a pyramid, an oblique pyramid, a wedge shape and a convex polyhedron, and a structure having a partial shape thereof is exemplified.

The vertical angle of the right circular cone or the oblique circular cone is 5 to 90°. The vertical angle of the pyramid, the oblique pyramid, the wedge shape or the convex polyhedron is 5 to 90°.

Moreover, at least one kind of a structure selected from the group consisting of a sphere, an ellipsoid, a paraboloid and a hyperboloid, and a structure having a partial shape thereof is also exemplified as the shape of the convex member.

Although not specifically limited, it is preferable that the vertical angle of the cones be between 5 to 90° in order that the light from the backside is efficiently transmitted. When the vertical angle is less than 5°, the ratio of the height to the base is large, so that the reflecting plate may be too thick. When the vertical angle exceeds 90°, the transmittance may be low.

The height of the cones is not specifically limited; it may be any height that is within a range not interfering with the layout of the members or the entire display in practical use. The distance between the vertices of the cones is not specifically limited, either.

The diameter of the cones is not specifically limited except that it is geometrically defined from the vertical angle and the height of the cones. However, when the transflective plate is used, for example, in a liquid crystal display, it is preferable that the diameter be several micrometers to several millimeters from the viewpoint of prevention of moire and nonuniform luminance.

Figure 4:
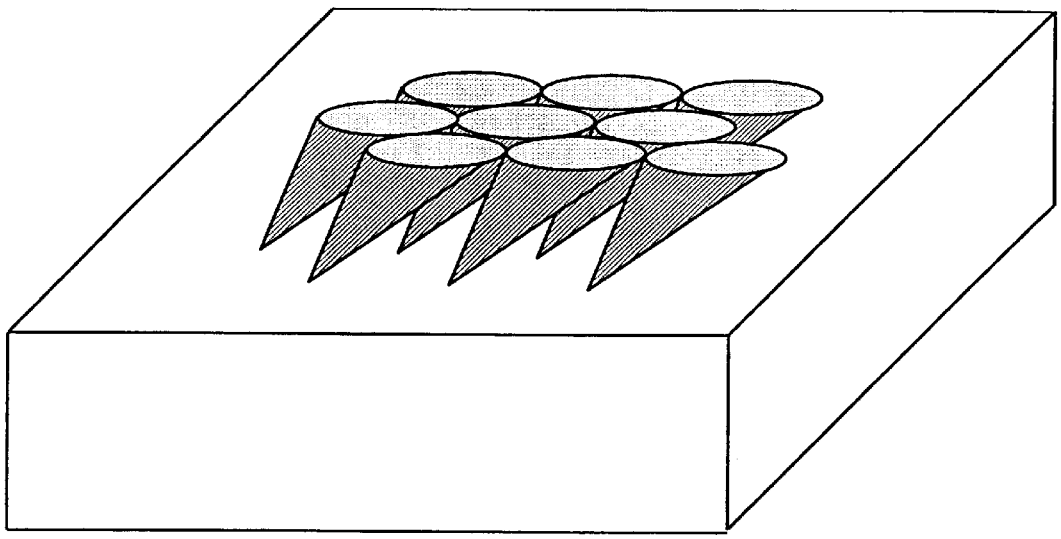

The arrangement of the cones is not specifically limited; the cones may be arranged so that the bases are in contact with one another as shown in FIG. 4 or that the bases are spaced as shown in FIG. 2. Moreover, the vertex directions of the cones may be all the same or may be different.

Moreover, in the gap among the cones, reflecting surfaces having a shape mentioned in the present invention or another shape such as small cones may be disposed.

In a case where cones of the same base area or different base areas are arranged on the same plane, when the distance between the cones is too large, the ratio of the total of the base areas of the cones to the entire area of the plane is too small, so that the reflectance of the light from the viewer's side may be low. When the ratio of the total of the base areas of the cones is too large, the transmittance of the light from the backside may be low.

In either case, the practical performance as a transflective plate or a light guide is degraded. Therefore, in the case of such an arrangement, it is desirable that the ratio of the base areas of the cones to the entire area of the plane be preferably 30 to 95%, more preferably 50 to 90%.

This applies to bases of shapes having convex configurations such as the pyramid, the wedge shape and the convex polyhedron.

In the case of a pyramidal reflecting layer, the vertical angle of the pyramid is not specifically limited, either. However, in order that the light from the backside be efficiently transmitted, it is preferable that the vertical angle be 5 to 90°. When the vertical angle is less than 5°, the ratio of the height to the base is large, so that the reflecting plate may be too thick. When the vertical angle exceeds 90°, the transmittance may be low.

The height of the pyramids is not specifically limited; it may be any height that is within a range not interfering with the layout of the members or the entire display. The distance between the vertices of the pyramids is not specifically limited, either. The number of sides of the pyramids is not specifically limited as long as it is not less than three.

In the case of reflecting layers of other shapes, there are no specific limitations as long as they are convex to the backside.

The shape and the arrangement of the reflecting layers are decided in view of the optimization of the transmission efficiency of the light from the backside when the backlight is used and the reflection efficiency in the reflective display when the backlight is not used.

A light diffusing plate for uniformizing the intensity distribution of the transmitted light or the reflected light may be disposed on the top surface of the transflective plate or the light guide when necessary.

Examples of the structure of the convex member of the present invention will be described below by use of the drawings.

(i) A transflective plate shown in FIG. 2 has conical convex members on a surface or inside thereof. A light guide is shown in FIG. 3. In FIG., "a" represents a ray trace of transmission of the light from the backside, and "b" represents a ray trace of reflection of the light from the viewer.

Figure 5:
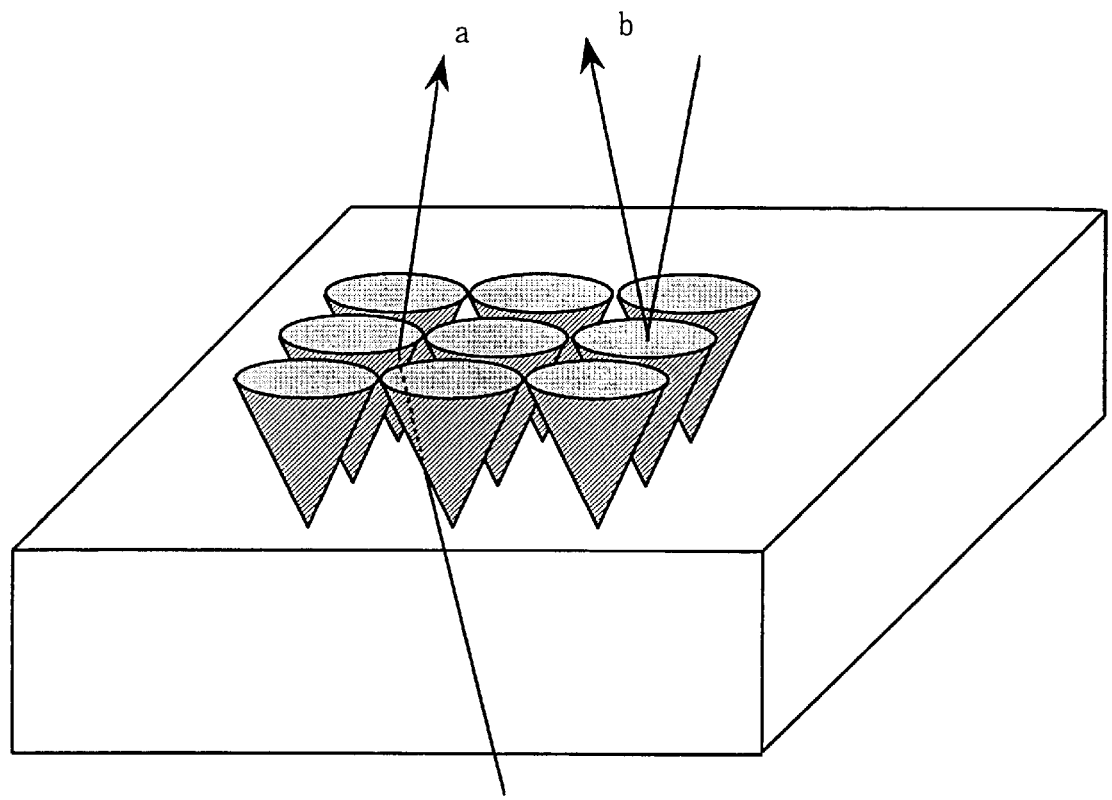
FIG. 5 A perspective view showing Example 3 of the present invention.
 a: Ray trace of transmission of the light from the backside
 b: Ray trace of reflectance of the light from the viewer
FIG. 6 A perspective view showing Example 5 of the present invention.

(ii) A transflective plate shown in FIG. 5 has conical convex members on a surface or inside thereof, and has light reflecting layers at bases of the cones.

(iii) A transflective plate shown in FIG. 4 has obliquely conical convex members on a surface or inside thereof, and has light reflecting layers at bases of the oblique cones.

Figure 6:
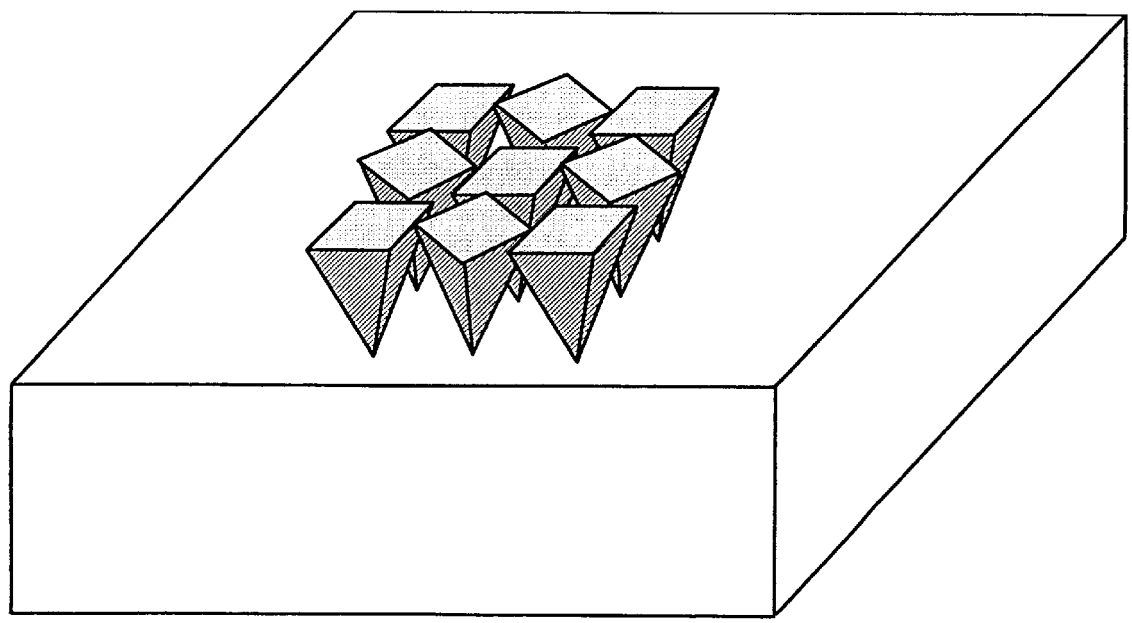

(iv) A transflective plate shown in FIG. 6 has pyramidal convex members on a surface or inside thereof, and has light reflecting layers at bases of the pyramids.

As described above, a base of at least one shape of the convex member of the present invention may have a light reflecting layer, or both a light reflecting layer and a light transmitting layer.

Moreover, a layer having both a light reflecting layer and a light transmitting layer may be provided on a part or the entire area of the plane on the viewer's side.

Figure 7:
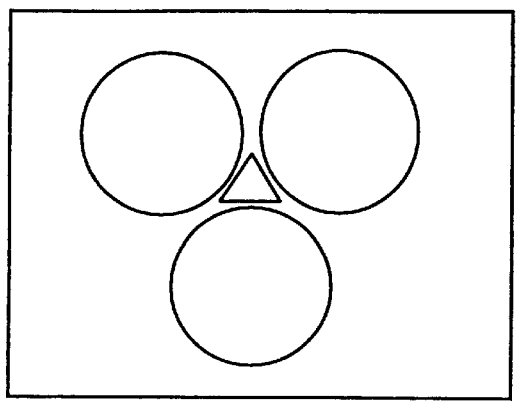
FIG. 7 A plan view and a side view showing an example of the present invention.
Figure 7:
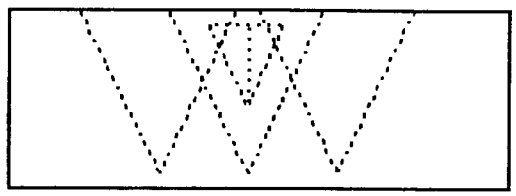

Further, the sizes and the vertex positions of the convex members such as the cones are not necessarily the same like in the above-described examples. For example, a structure as shown in FIG. 7 may be employed. Moreover, a combination of different shapes or a combination of partial shapes thereof may be employed.

Examples of the base material of the transflective plate of the present invention include transparent and semitransparent resins such as polyester, polycarbonate, polyacrylate and polyolefin, and transparent and semitransparent plates such as a glass plate. Among them, polyethylene terephthalate, polycarbonate and polymethyl methacrylate are preferable. The thickness of base material is, for example, approximately 20 μm to 5 mm although not specifically limited.

Examples of the method for forming a surface of the base material surface into the above-mentioned shapes include the following:

1) a method in which a negative die of a target shape is formed on a roll or a matrix, and the shape is provided by transfer method;

2) a method in which a negative die of a target shape is formed on a roll or a matrix, and a thermosetting resin is filled in the concave, and separated from the negative die after being set by heating;

3) a method in which a negative die of a target shape is formed on a roll or a matrix, and after an ultraviolet-curing or electron-radiation-curing resin is applied and filled in the concave, ultraviolet rays or electron rays are applied with an intaglio being covered with a transparent base material film through a resin liquid, and the resin being cured and the base material film to which the resin adheres are separated from the intaglio;

4) a solvent casting method in which a negative die of a target shape is formed on a casting belt, and the target shape is provided at the time of casting;

5) a method in which a resin that is cured by light or heating is printed onto a transparent substrate and cured by light or heating to form a convex or a concave; and 6) a method in which a surface of the base material is cut down by using a machine tool and the like.

There are cases where the surface of the shape is made rough in order that the reflected light in the reflecting condition is appropriately dispersed. Examples of the method thereof include the following:

1) a method in which a surface of the plate of the negative die is beforehand made rough;

2) a method in which a resin comprising a mixture of organic and inorganic particles is pressed against a plate of the negative die;

3) a method in which after the target shape is formed, the surface is sandblasted; and 4) a method in which the target shape is formed, and after the reflecting layer is formed, the surface is coated with a coating liquid containing inorganic and organic fine particles by deposition.

A light reflecting layer forming method of the present invention will be described below.

While the reflecting layer can be formed by a method in which materials of different refractive indices are combined to form a reflecting surface, the reflecting layer can be formed by the following methods:

1. A method in which a metal or a white pigment is deposited

Examples of the metal include aluminum, silver and the like. Examples of the white pigment include titanium oxide, zinc oxide, lithopone, zinc white, calcium plumbate, basic lead sulfate, tin oxide, zirconium oxide, barite, calcium carbonate, precipitated calcium carbonate, alumina white, silicic acid, silicates, and clay. The method for depositing these substances and the thickness of the deposition are not limited as long as the reflected light quantity distribution characteristic of the base material surface does not change due to the deposition. For example, a method normally used for forming a thin film such as vacuum deposition, sputtering or ion plating which method is appropriately selected according to the kind of the base material can be used. The thickness of the deposition may be any range where a high reflectance is obtained, for example, approximately 50 to 5000 Å.

Then, in order to bring a part of the base material surface to the transmitting condition, a mask is formed over a part to be the transmitting part before coating, and after the deposition is performed over the entire surface, the reflecting part together with the mask is separated to form the transmitting part.

When the deposition is performed by using silver as the metal having a high reflectance characteristic, it is preferable to provide a protective film on a surface of the silver-deposited layer in order to prevent the deposit from deteriorating. Examples of the protective layer include a film to which acrylic resin, epoxy resin, polyester resin, urethane resin or alkyd resin is applied, although not specifically limited thereto. The application can be performed by a normal method such as roll coating, gravure coating or spray coating. Moreover, a thin film of a metal such as copper or Inconel, or of an inorganic substance such as SiO2 may be used. The thickness of the protective film may be any range where silver is prevented from oxidizing, for example, a range from 5 nm to 10 μm.

2. A method in which a lustrous inorganic and/or organic matter is deposited

The method for depositing the inorganic substance or the organic substance and the thickness of the deposition are not limited as long as the reflected light quantity distribution characteristic of the base material surface does not change due to the deposition. For example, a method normally used for forming a metal thin film such as vacuum deposition, sputtering or ion plating which method is appropriately selected according to the kind of the base material can be used. The thickness of the deposition is, for example, approximately 50 to 5000 Å.

Moreover, in order to bring a part of the base material surface to the transmitting condition, a mask is formed over a part to be the transmitting part before coating, and after the deposition is performed over the entire surface, the reflecting part together with the mask is separated to form the transmitting part.

3. A method in which the surface is coated with a metal powder and/or a white pigment through a resin binder The powder is not specifically limited as long as it is lustrous like aluminum, aluminum oxide, titanium oxide and the like. Examples of the resin binder include acrylic resin, urethane resin, epoxy resin, polyester resin and alkey resin, although not specifically limited thereto. The resin binder can be applied by a normal method such as roll coating, gravure coating or spray coating. The thickness of the coating is approximately 5 to 200 μm. The resin binder may have an adhesion property.

Moreover, in order to bring a part of the base material surface to the transmitting condition, a mask is formed over a part to be the transmitting part before coating, and after the entire surface is coated, the reflecting part together with the mask is separated to form the transmitting part.

4. A method in which the surface is coated with lustrous inorganic and/or organic fine particles through a resin binder Examples of the lustrous inorganic and/or organic fine particles include fine particles having iridescent luster such as a pearlescent pigment of synthetic or natural mica covered with titanium dioxide, plate fish scale guanine and hexangular plate basic lead carbonate, although not specifically limited thereto. The resin binder is not specifically limited as mentioned above.

The number of reflecting layers obtained as described above may be one, or a multiplicity of reflecting layers may be provided by performing the above-described operation a plurality of times. There are cases where it is preferable to provide light diffusibility on the surface of the reflecting layer when the display is used in the reflecting condition. In such cases, a reflecting layer may be formed in which the surface of the reflecting layer on the backside is not made rough and the reflecting surface on the viewer's side is made rough by machining or etching to thereby provide light diffusibility. With this two-layer structure, the light from the backside is not diffused but is reflected toward the viewer's side and the light from the viewer's side is diffuse-reflected.

The reflecting layer can be protected with a transparent resin or the like.

In the present invention, the base of the convex member on the surface of the obtained transflective plate can be flattened by filling concaves inside the convex member with a resin or the like. Examples of the method therefor include the following:

(a) a method in which after an ultraviolet-curing resin or an electron-radiation-curing resin is filled and the surface is leveled, ultraviolet rays or electron rays are applied to cure the resin; and (b) a method in which a thermoplastic resin in a molten state is filled and pressurized with a roll so as to be smoothed, and a method in which a sheet having a configuration such that the negative configuration (convex configuration) for the concaves inside the convex member or an upper part of the negative configuration is missing is fitted or laminated.

The resin or the like to be filled in the concaves inside the convex member may be transparent or non-transparent.

On the flattened base of the convex member, a reflecting layer can be formed by the above-described method.

Moreover, the base can also be flattened by burying the part of the convex member by filling a transparent resin or the like outside the convex member by a method similar to the above-described method.

In the optical plate of the present invention, particles of pearl mica or the like used in the conventional transflective plates can be dispersed into the plate.

Moreover, the optical plate of the present invention can be used with the following being laminated thereto: a transflective plate in which particles of pearl mica or the like are dispersed; or a material having a diffusing function such as a semi-opaque film.

A transflective polarizer suitable for TN-type and STN type reflective liquid crystal displays can be formed by laminating the transflective plate of the present invention on a polarizer by bonding with a known acrylic adhesive or the like. By mounting this transflective polarizer on a liquid crystal display, a transflective liquid crystal display excellent in viewability is obtained.

A transflective backlight unit can be obtained by using a light guide of the present invention in combination with a cathode ray tube lamp, a reflecting plate and the like. By mounting such a transflective backlight on a liquid crystal display, a transflective liquid crystal display excellent in viewability can be obtained.

When used as a reflective display, a transflective liquid crystal display using the transflective plate of the present invention is bright and excellent in viewability compared to conventional liquid crystal displays. When used as a transmissive display, the transflective liquid crystal display is large in the transmitted light quantity compared to the conventional transflective plates, so that bright display can be provided. When used as a battery-driven portable display, the transflective liquid crystal display can be used for a long time.

EXAMPLES

Example

Hereinafter, the present invention will be described in more detail by use of examples, which are not to be construed as limiting the scope of the present invention.

Example 1

Figure 8:
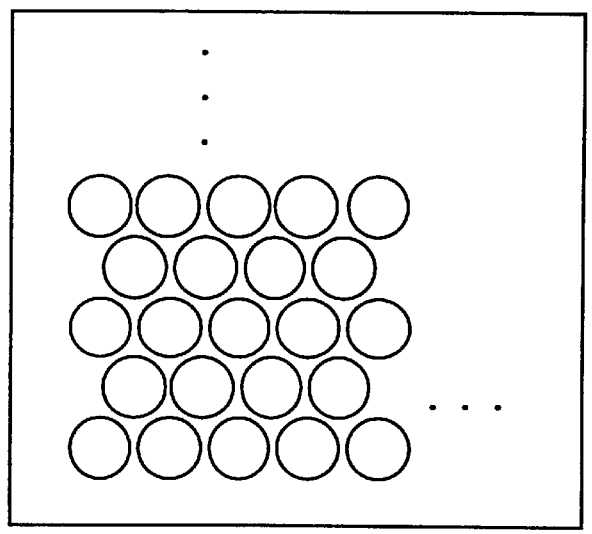
FIG. 8 A plan view and a side view showing Example 1 of the present invention.
Figure 8:
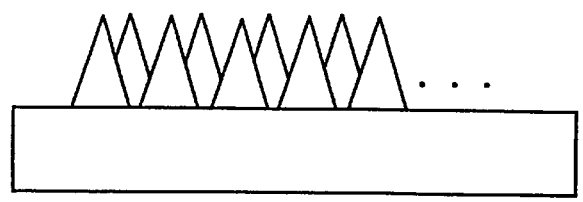

A molded article as shown in FIG. 8 having a multiplicity of conical protrusions with a vertical angle of 30°, a diameter of 1 mm and a base-to-base distance of 100 μm on the surface thereof was formed by pouring a methyl methacrylate monomer into a conical concave mold, curing it by beat polymerization and separating it from the mold. With this as the base material, aluminum was deposited. After the deposition, the deposite on the flat part of the substrate plate was removed to form a light transmissive part. The ratio of the transmissive part to the reflective part of the obtained transflective plate was such that the transmissive part occupied approximately 25% and the reflective part occupied approximately 75% when compared based on the area of projection onto the plate surface from a direction vertical to the plate surface. The transmittance of the vertical light from the cone vertex side (backside) of the obtained transflective plate was 72%, and the reflectance of the light from the opposite direction (viewer's side) was 62%. Thus, the transmittance and the reflectance were both high.

The obtained transflective plate was laminated to a polarizer with a pressure-sensitive adhesive to obtain a transflective liquid crystal display. The liquid crystal display was bright and excellent in viewability when driven. The liquid crystal display was also bright and excellent in viewability when viewed with the backlight on in a dark room.

Example 2

Embossing is performed on polymethyl methacrylate by use of a metal roll of a conical convex shape, and then, aluminum is deposited onto the surface. The concaves are filled with a photo-setting resin and the photo-setting resin is cured by ultraviolet curing to flatten the surface. The deposit on the flat part is removed by polishing to obtain the transflective plate of FIG. 2. The reflectance of the obtained transflective plate is high and the transmittance thereof is also high. The obtained transflective plate is laminated to a polarizer with a pressure-sensitive adhesive to obtain a transflective liquid crystal display apparatus. The liquid crystal display is bright and excellent in viewability when driven. The liquid crystal display is also bright and excellent in viewability when viewed with the backlight on in a dark room.

Example 3

The part of the flat transflective plate of Example 2 other than the photo-setting resin part is masked, and silver is deposited thereonto to obtain a transflective plate as shown in FIG. 5. The obtained transflective plate is laminated to a polarizer with a pressure-sensitive adhesive to obtain a transflective liquid crystal display. The liquid crystal display is bright and excellent in viewability when driven. The liquid crystal display is also bright and excellent in viewability when viewed with the backlight on in a dark room.

Example 4

A transflective plate as shown in FIG. 4 is obtained in the same manner as in Example 3 except that the shape of the light reflecting layer is an oblique cone inclined 30° to the normal to the plate. The obtained transflective plate is laminated to a polarizer with a pressure-sensitive adhesive to obtain a transflective liquid crystal display. The liquid crystal display is bright and excellent in viewability when driven. The liquid crystal display is also bright and excellent in viewability when viewed with the backlight on in a dark room.

Example 5

A thermoplastic resin is poured into a pyramidal concave mold, and after being cooled, the resin is separated from the mold to obtain a sheet having a multiplicity of pyramidal protrusions. Silver is deposited onto the surface, a photo-setting resin is filled, the photo-setting resin is cured by ultraviolet curing, and the flat part of the thermoplastic resin is removed by polishing to obtain a flat transflective plate as shown in FIG. 6. The obtained transflective plate is laminated to a polarizer with a pressure-sensitive adhesive to obtain a transflective liquid crystal display. The liquid crystal display is bright and excellent in viewability when driven. The liquid crystal display is also bright and excellent in viewability whet viewed with the backlight on in a dark room.

Example 6

Figure 9:
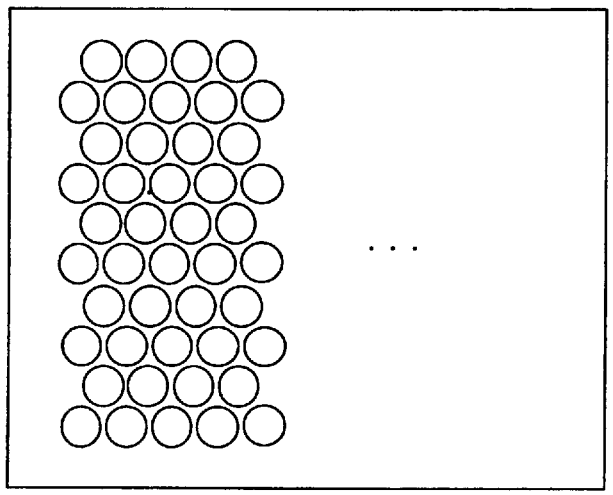
FIG. 9 A plan view and a side view showing Example 6 of the present invention.
Figure 9:
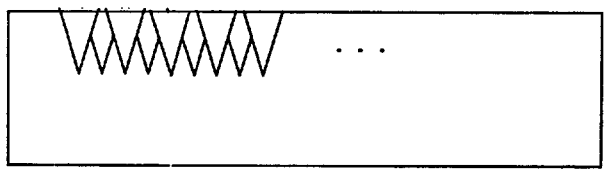

A molded article as shown in FIG. 9 having a multiplicity of conical concaves with a vertical angle of 30°, a diameter of 1 mm and a base-to-base distance of 100 μm on the surface thereof was formed by drilling a methyl methacrylate resin plate with a thickness of 4 mm. Then, a fluid dispersion consisting of ten parts by weight of powdery titanium oxide TT051-A (manufactured by Ishihara Sangyo Kaisha, Ltd.), 1.7 parts by weight of polyvinyl butyral (manufactured by Denki Kagaku Kogyo K. K., the molecular weight approximately 2000) and 28 parts by weight of methanol was filled and air-dried to remove the methanol by evaporation, thereby obtaining a light guide having conical concaves filled with a composition of the powdery titanium oxide and the polyvinyl butyral. In the obtained light-guide, the transmittance of the vertical light from the cone vertex side was 40% and the reflectance of the light from the opposite direction was 65%. Thus, both the transmittance and the reflectance were high.

By combining a cathode ray tube lamp, a reflecting plate and the like by use of the obtained light guide, a transflective liquid crystal display is obtained. The liquid crystal display is bright and excellent in viewability when driven. It is also bright and excellent in viewability when used as a reflective display in which the backlight is not turned on.

Example 7

A molded article having a multiplicity of conical concaves on the surface thereof is formed by performing embossing on polymethyl methacrylate by use of a metal roll of a conical convex shape. Aluminum is deposited on the surface thereof in a thickness of approximately 2000 Å. After the deposition, only the flat part of the deposit on the embossed surface except the conical concaves is removed by polishing to obtain the light guide of FIG. 3. A transflective liquid crystal display is obtained by use of the obtained light guide. When driven, the liquid crystal display is excellent in viewability even with the backlight off.

Example 8

Figure 10:
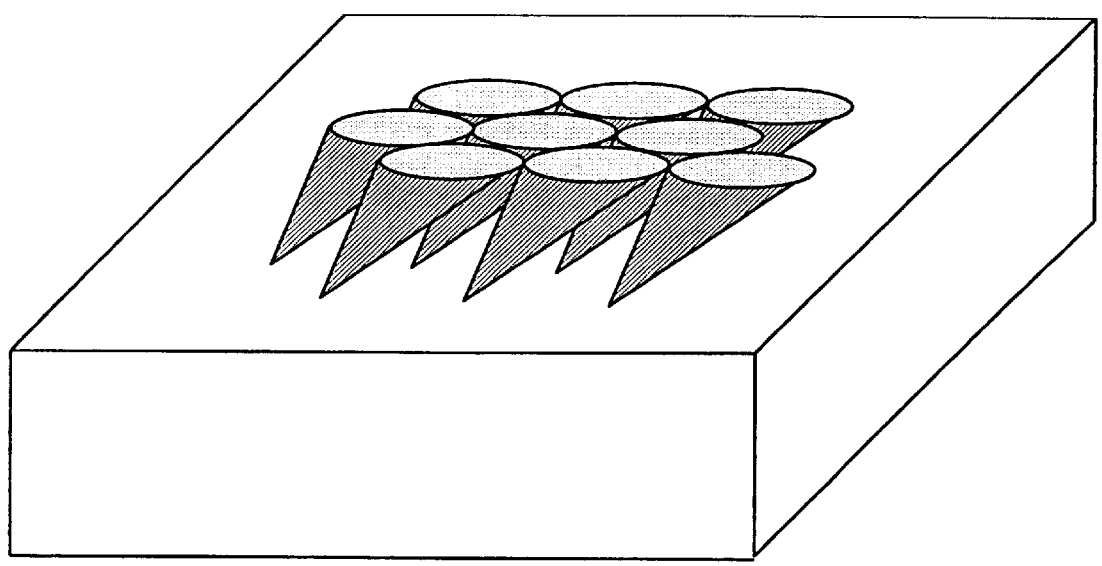
FIG. 10 A perspective view showing Example 8 of the present invention.

A light guide as shown in FIG. 10 is obtained in the same manner as in Example 6 except that the shape of the light reflecting layer is an oblique cone inclined 30° from the normal to the plate toward the light source side. A transflective liquid crystal display is obtained by use of the obtained light guide. When driven, the liquid crystal display is excellent in viewability even with the backlight off.

What is claimed is:

1. An optical plate having both a light reflecting function and a light transmitting function comprising
   a layer comprising convex members which are arranged inside or on a surface of the optical plate so that a tip of the convex portion faces a backside of the optical plate,
   a gap having a transmitting function which is formed between the convex members, and
   a reflecting layer which is arranged on an outer surface of the convex portion, and on a base or an inner surface of the convex portion,
   wherein said convex members, said gap and said reflecting layer are arranged so that apart of light ray from the backside directly passes through the gap between the convex members, that a part of remaining light ray is reflected at least one time at the reflecting layer on the outer surface of the convex portion and passes through the gap having a transmitting function formed between the convex members to come out from a surface of the optical plate, and that a part of incident light ray from the surface side is reflected at the reflecting layer on the base or the inner surface of the convex portion to come out from a surface of the optical plate.

2. The optical plate according to claim 1, wherein the convex members have at least one kind of a structure or a partial structure selected from the group consisting of a right circular cone, an oblique circular cone, a pyramid, an oblique pyramid, a wedge shape and a convex polyhedron.

3. The optical plate according to claim 2, wherein the right circular cone or the oblique circular cone has a vertical angle of 5 to 90°.

4. The optical plate according to claim 2, wherein the pyramid, the oblique pyramid, the wedge shape or the convex polyhedron has a vertical angle of 5 to 90°.

5. The optical plate according to claim 1, wherein the convex members have at least one kind of a structure or a partial structure selected from the group consisting of a sphere, an ellipsoid, a paraboloid and a hyperboloid.

6. The optical plate according to claim 1, wherein at least one base of the convex members is a light reflecting layer.

7. The optical plate according to claim 1, wherein at least one base of the convex members comprises a layer having both a light reflecting layer and a light transmitting layer.

8. The optical plate according to claim 1, wherein the optical plate comprises a transparent or semitransparent resin or a transparent or semitransparent glass plate.

9. The optical plate according to claim 8, wherein the transparent or semitransparent resin is at least one resin selected from the group consisting of polyester resin polycarbonate resin, polyacrylate resin and polyolefin resin.

10. The optical plate according to claim 8, wherein the transparent or semitransparent resin is at least one resin selected from the group consisting of polyethylene terephthalate resin, polycarbonate resin and polymethacrylate resin.

11. A transflective plate comprising the optical plate according to claim 1.

12. A transflective polarizer obtained by laminating the transflective plate according to claim 11 with a polarizer.

13. A liquid crystal display comprising a transflective plate according to claim 11 or a transflective polarizer according to claim 12.

14. A light guide comprising the optical plate according to claim 1.

15. A backlight unit for a liquid crystal display comprising the light guide according to claim 14.

16. A liquid crystal display comprising the light guide according to claim 14 or the backlight unit for the liquid crystal display according to claim 15.

* * * * *